United States Patent
Vangala et al.

(10) Patent No.: US 12,439,472 B2
(45) Date of Patent: Oct. 7, 2025

(54) RECEIVING DATA WITHOUT MONITORING CONTROL CHANNEL

(71) Applicant: Apple Inc., Cupertino, CA (US)

(72) Inventors: Sarma V. Vangala, Campbell, CA (US); Dawei Zhang, Saratoga, CA (US); Fangli Xu, Beijing (CN); Haijing Hu, Los Gatos, CA (US); Murtaza A. Shikari, Mountain View, CA (US); Sethuraman Gurumoorthy, San Ramon, CA (US); Srirang A. Lovlekar, Fremont, CA (US); Wei Zeng, Saratoga, CA (US); Yuchul Kim, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 533 days.

(21) Appl. No.: 17/759,930

(22) PCT Filed: Feb. 12, 2020

(86) PCT No.: PCT/CN2020/074917
§ 371 (c)(1),
(2) Date: Aug. 2, 2022

(87) PCT Pub. No.: WO2021/159327
PCT Pub. Date: Aug. 19, 2021

(65) Prior Publication Data
US 2023/0069465 A1    Mar. 2, 2023

(51) Int. Cl.
*H04W 76/27*    (2018.01)
*H04W 52/02*    (2009.01)
(Continued)

(52) U.S. Cl.
CPC ....... *H04W 76/27* (2018.02); *H04W 52/0216* (2013.01); *H04W 52/0229* (2013.01); *H04W 72/1273* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 10,412,780 | B2 | 9/2019 | Manepalli et al. |
| 2009/0052420 | A1 | 2/2009 | Fischer |

(Continued)

FOREIGN PATENT DOCUMENTS

| | | |
|---|---|---|
| CN | 105050165 | 11/2015 |
| CN | 105393626 | 3/2016 |

(Continued)

OTHER PUBLICATIONS

Apple, "UE assistance information", 3GPP TSG RAN WG2 Meeting #105, R2-1901838, Feb. 15, 2019, 5 sheets.
(Continued)

*Primary Examiner* — Robert M Morlan
(74) *Attorney, Agent, or Firm* — Fay Kaplun & Marcin, LLP (57) ABSTRACT

A method, user equipment (UE) and integrated circuit for receiving data transmitted over a wireless network. The method includes executing an application that receives data from the network, transmitting UE assistance information to the network, wherein the UE assistance information corresponds to a traffic pattern for the data that is received from the network for the application, entering a radio resource control (RRC) inactive state and receiving the data from the network while in the RRC inactive state.

20 Claims, 6 Drawing Sheets

(51) Int. Cl.
*H04W 72/1273* (2023.01)
*H04W 72/21* (2023.01)

(56) References Cited

U.S. PATENT DOCUMENTS

| | | | |
|---|---|---|---|
| 2012/0282975 A1* | 11/2012 | Mujtaba | H04W 88/06 |
| | | | 455/552.1 |
| 2013/0201851 A1 | 8/2013 | Chou et al. | |
| 2015/0304883 A1 | 10/2015 | Tabet et al. | |
| 2017/0367110 A1 | 12/2017 | Li et al. | |
| 2018/0343686 A1 | 11/2018 | Manepalli et al. | |
| 2019/0349886 A1 | 11/2019 | Lee et al. | |
| 2023/0337274 A1* | 10/2023 | Fujishiro | H04W 4/70 |
| 2024/0147368 A1* | 5/2024 | Shubhi | H04W 52/0235 |

FOREIGN PATENT DOCUMENTS

| | | |
|---|---|---|
| CN | 109644089 | 4/2019 |
| CN | 110463260 | 11/2019 |
| JP | 2010-524329 | 7/2010 |
| JP | 2017-510124 | 4/2017 |
| JP | 2020-504536 | 2/2020 |
| WO | 2018062957 | 4/2018 |

OTHER PUBLICATIONS

Intel Corporation, "Report on [105bis#28][NR/Power Savings] UE assistance", 3GPP TSG RAN WG2 Meeting #106, R2-1906426, 24 sheets.
Apple, "UE Assisted RRC State Transition", 3GPP TSG-RAN WG2, Meeting #106, R2-1907166, May 3, 2019, 3 sheets.
Apple, "Requesting to enter RRC Inactive state", 3GPP TSG-RAN WG2, Meeting #103bis, R2-1815062, Sep. 28, 2018, 2 sheets.
ASUSTeK, "Downlink data transmission and reception in NR new state", 3GPP TSG-RAN WG2 Meeting #96, R2-168090, Nov. 4, 2016, 5 sheets.
Apple Inc., "Traffic aware UE power saving techniques with UE assistance", 3GPP TSG RAN WG1 #98b, R1-1910975, Oct. 5, 2019, 5 sheets.
Huawei, HiSilicon, "DL data transmission in RRC_Inactive", 3GPP TSG-RAN WG2 #97, R2-1701792, Feb. 4, 2017, 5 sheets.

* cited by examiner

RECEIVING DATA WITHOUT MONITORING CONTROL CHANNEL

BACKGROUND

A user equipment (UE) may connect to a network (e.g., a Long Term Evolution (LTE) network, a 5G New Radio (NR) network, etc.). When connected to the network, the UE may receive data from the network related to various applications that are running on the UE. In some instances, this data may be audio or video real time HTTP traffic. In fact, it is currently estimated that 40%-50% of cellular data traffic is this type of traffic and it is estimated that number will grow over time as more users stream audio and video content to their mobile devices.

To support this traffic, the UE is continuously using power to keep the channel up in expectation of the arrival of new data. Specifically, the UE must monitor the Physical Downlink Control Channel (PDCCH) to determine when DL traffic is being sent by the network. There are some techniques that have been developed to attempt to save power such as DRX (Discontinuous Reception). However, these techniques are not extending battery life of the UE by a significant amount during streaming operations. In addition, it is anticipated that 5G NR will use significantly more power during these operations because the UE will have to monitor a larger frequency range.

SUMMARY

According to some exemplary embodiments, a method is performed by a user equipment (UE) that is connected to a network. The method includes executing an application that receives data from the network, transmitting UE assistance information to the network, wherein the UE assistance information corresponds to a traffic pattern for the data that is received from the network for the application, entering a radio resource control (RRC) inactive state and receiving the data from the network while in the RRC inactive state.

Further exemplary embodiments include a user equipment (UE) having a transceiver and a processor. The transceiver is configured to communicate with a network. The processor is configured to perform operations that include executing an application that receives data from the network, transmitting UE assistance information to the network, wherein the UE assistance information corresponds to a traffic pattern for the data that is received from the network for the application, entering a radio resource control (RRC) inactive state and receiving the data from the network while in the RRC inactive state.

Still further exemplary embodiments include an integrated circuit that has circuitry configured to transmit UE assistance information to a network, wherein the UE assistance information corresponds to a traffic pattern for data that is received from the network for an application, circuitry configured to enter a radio resource control (RRC) inactive state and circuitry configured to receive the data from the network while in the RRC inactive state.

DETAILED DESCRIPTION

The exemplary embodiments may be further understood with reference to the following description and the related appended drawings, wherein like elements are provided with the same reference numerals. The exemplary embodiments relate to receiving data from the network without the need to monitor the Physical Downlink Control Channel (PDCCH). More specifically, the exemplary embodiments allow the UE to remain in an RRC Inactive State when receiving the DL data. Because the UE remains in the RRC inactive state, the UE does not have to monitor the PDCCH and thereby saves the power associated with the monitoring.

Throughout this description, the terms "DL data" and "streaming data" are used interchangeably to refer to data that is being sent from the network to the UE. While the exemplary embodiments are described with regard to audio and/or video streaming data, those skilled in the art will understand that the exemplary embodiments may be used during the downlink (DL) for any type of data. As will be described in more detail below, the exemplary embodiments may be used when the DL data traffic pattern is generally predictable.

In addition, throughout this description, the exemplary embodiments are described with reference to downlink (DL) data, e.g., data that is sent from the network to the UE. However, those skilled in the art will understand that the exemplary embodiments may also apply to the uplink (UL), e.g. data that is sent from the UE to the network. Those skilled in the art will understand the modifications to implement the exemplary embodiments to the UL.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

In addition, the exemplary embodiments are described with reference to the network being an LTE or a 5G NR network. However, it should be understood that the exemplary embodiments may be implemented in any network (cellular or non-cellular) in accordance with the principles of operation described herein for the LTE and/or 5G NR network.

The exemplary embodiments are also described with reference to the PDCCH. In LTE and 5G NR, the PDCCH carries Downlink Control Information (DCI) from the network to the UE, e.g., the PDCCH provides the UE with information to understand when (time) and where (frequency) DL traffic is being sent to the UE. It should be understood that the term PDCCH is being used as the exemplary embodiments are being described with reference to LTE and/or 5G networks. Other types of networks may have a similar concept that is described by a different name. In the context of the exemplary embodiments, the monitoring of the PDCCH is being eliminated or substantially reduced for the DL data.

Figure 1:
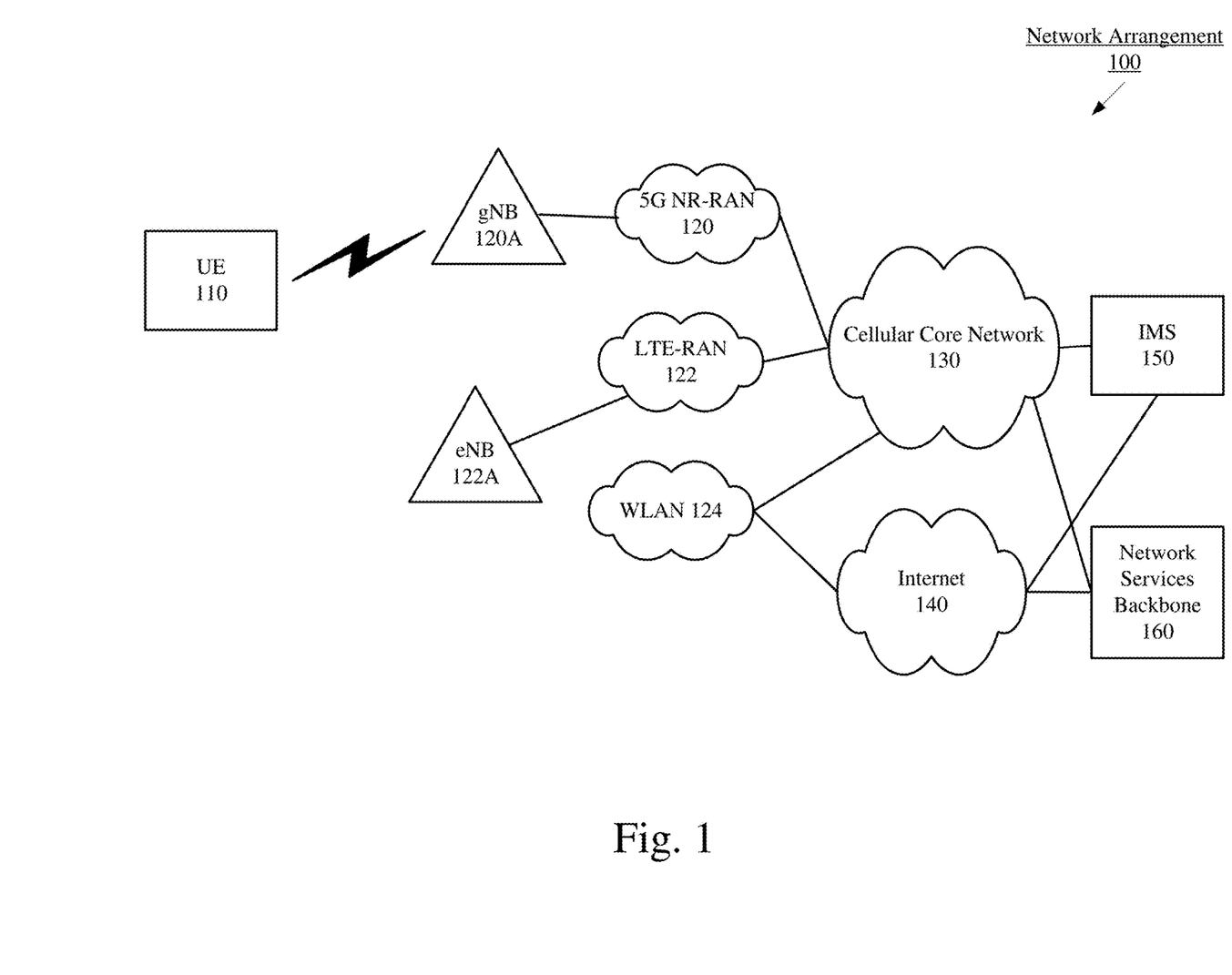
FIG. 1 shows an exemplary network arrangement according to various exemplary embodiments.

FIG. 1 shows an exemplary network arrangement 100 according to various exemplary embodiments. The exemplary network arrangement 100 includes a UEs 110. Those skilled in the art will understand that the UE 110 may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of one UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. The UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110 may connect to the 5G NR-RAN via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to a single gNB 120A is merely for illustrative purposes. The exemplary embodiments may apply to any appropriate number of gNBs. The UE 110 may also connect to the LTE-RAN 122 via the eNB 122A.

Those skilled in the art will understand that any association procedure may be performed for the UE 110 to connect to the 5G NR-RAN 120 and the LTE-RAN 122. For example, as discussed above, the 5G NR-RAN 120 and the LTE-RAN 122 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120, the eNB 122A of the LTE-RAN 122).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The UE 110 may be configured to be in one of a plurality of different operating states. One operating state may be characterized as RRC idle state, another operating state may be characterized as RRC inactive state and another operating state may be characterized as RRC connected state. RRC refers to the radio resource control (RRC) protocols. Those skilled in the art will understand that when the UE 110 is in RRC connected state, the UE 110 and the 5G NR-RAN 120 and/or LTE-RAN 122 may be configured to exchange information and/or data. The exchange of information and/or data may allow the UE 110 to perform functionalities available via the network connection. Further, those skilled in the art will understand that when the UE 110 is in the RRC idle state the UE 110 is generally not exchanging data with the network and radio resources are not being assigned to the UE 110 within the network. In RRC inactive state, the UE 110 maintains an RRC connection while minimizing signaling and power consumption. However, when the UE 110 is in RRC idle state or RRC inactive state, the UE 110 may monitor for information and/or data transmitted by the network. Throughout this description these terms are being used generally to describe states the UE 110 may be in when connected to any network and that exhibit the characteristics described above for the RRC idle, RRC connected and RRC inactive states. As will be described in greater detail below, the exemplary embodiments may allow the UE 110 to receive the DL traffic when in the RRC inactive state.

Figure 2:
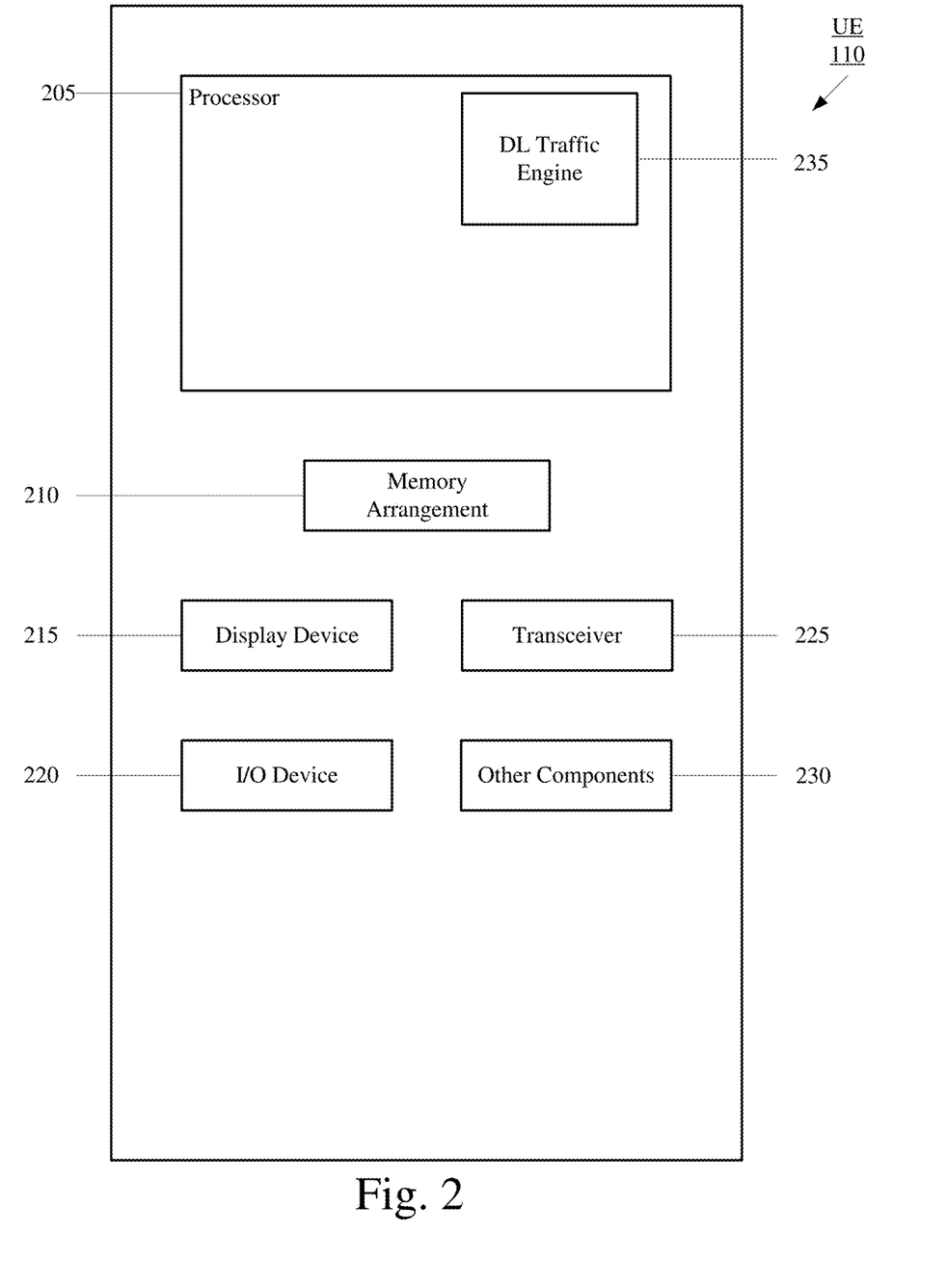
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225, and other components 230. The other components 230 may include, for example, a SIM card, an embedded SIM (eSIM), an audio input device, an audio output device, a power supply, a data acquisition device, ports to electrically connect the UE 110 to other electronic devices, etc.

The processor 205 may be configured to execute a plurality of engines of the UE 110. For example, the engines may include a DL traffic engine 235. The DL traffic engine 235 may be used to coordinate DL traffic with the network allowing the UE 110 to remain in the RRC inactive state and receive DL traffic without monitoring the PDCCH. Multiple signaling diagrams will be provided below to describe various exemplary signaling between the UE 110 and the network (5G NR-RAN 120 or LTE-RAN 122) that facilitates the UE 110 to receive DL traffic while in the RRC inactive state. As part of the signaling, the UE 110 (e.g., the DL traffic engine 235) may provide the network with UE assistance information to aid the network in formatting the DL data for download such that the UE 110 may receive the DL data in the RRC inactive state. The UE assistance information will be described in greater detail below when describing the signaling diagrams.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 124, etc. Accordingly, the transceiver 225 may operate on a variety of different frequencies or channels (e.g., set of consecutive frequencies).

Figure 3:
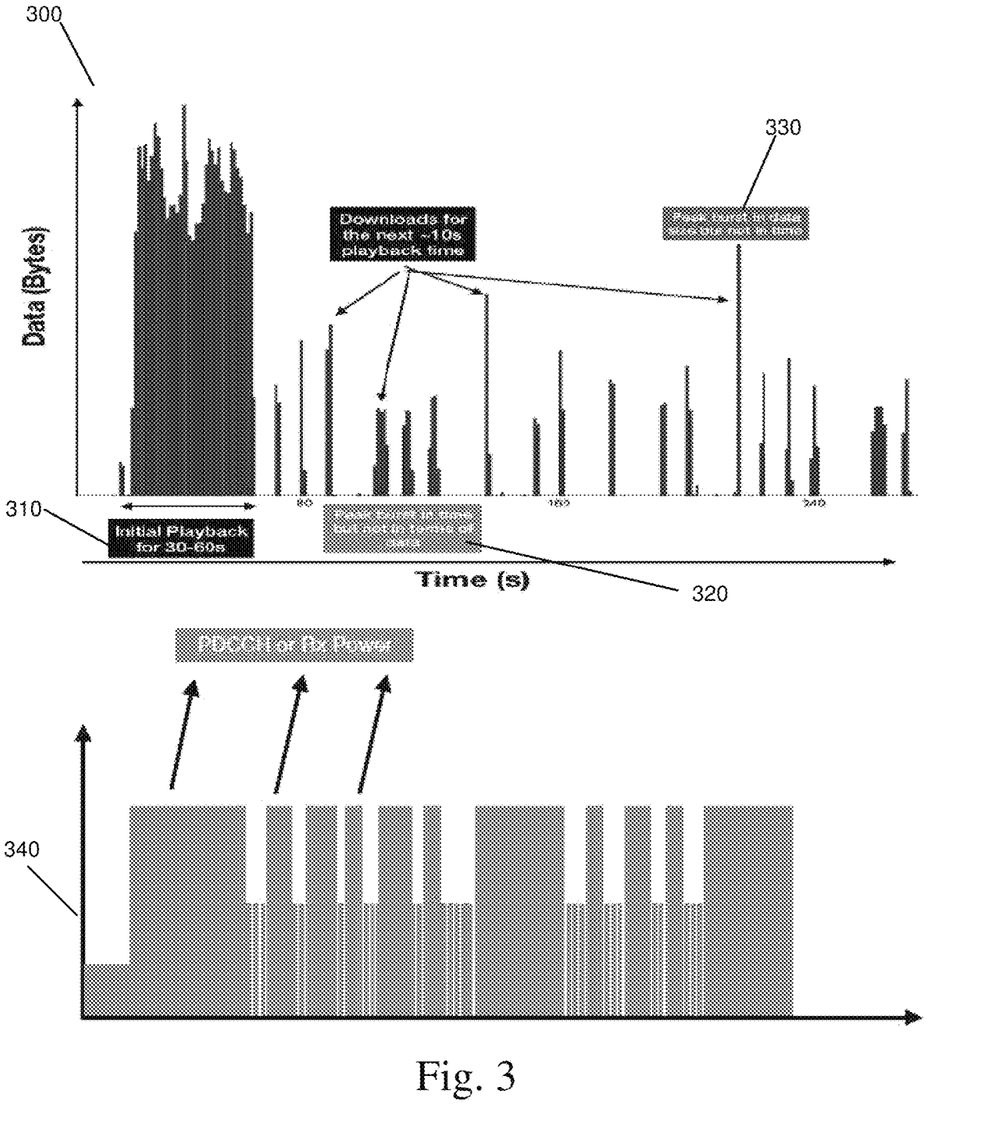
FIG. 3 shows an example of a data traffic pattern and the current PDCCH monitoring used for that traffic pattern.

FIG. 3 shows an example of a data traffic pattern 300 and the current PDCCH monitoring 340 used for that traffic pattern. As described above, this data traffic pattern is an example of audio and/or video data that is being streamed to the UE 110. However, as described above, the exemplary embodiments are not limited to this type of data. The upper graph 300 of FIG. 3 shows that there is an initial large download for buffering purposes as shown in the area 310 of the graph 300. Then data is downloaded in a prescribed pattern based on the radio conditions. This traffic pattern is typically a short duration data burst followed by a time when no data is transmitted. The data bursts may have various characteristics. For example, the first set of data bursts 320 are the longest duration data bursts. The data burst 330 is the peak data burst in terms of the amount of data. The remainder of the data bursts vary in terms of duration and amount of data.

The bottom graph 340 shows the monitoring of the PDCCH in the conventional manner of downloading the data during the RRC connected state. As can be seen from this bottom graph 340, even with the DRX being used, the UE 110 is constantly monitoring the PDCCH thereby using a large amount of power. In contrast, the exemplary embodiments minimize the need for the UE 110 to monitor the PDCCH when receiving the DL data. For example, when the UE 110 is in the RRC inactive state (whether the UE 110 is receiving DL data or not receiving DL data), the UE 110 is not monitoring the PDCCH. By reducing the amount of time monitoring the PDCCH, the UE 110 is reducing the power consumption associated with this monitoring.

Figure 4:
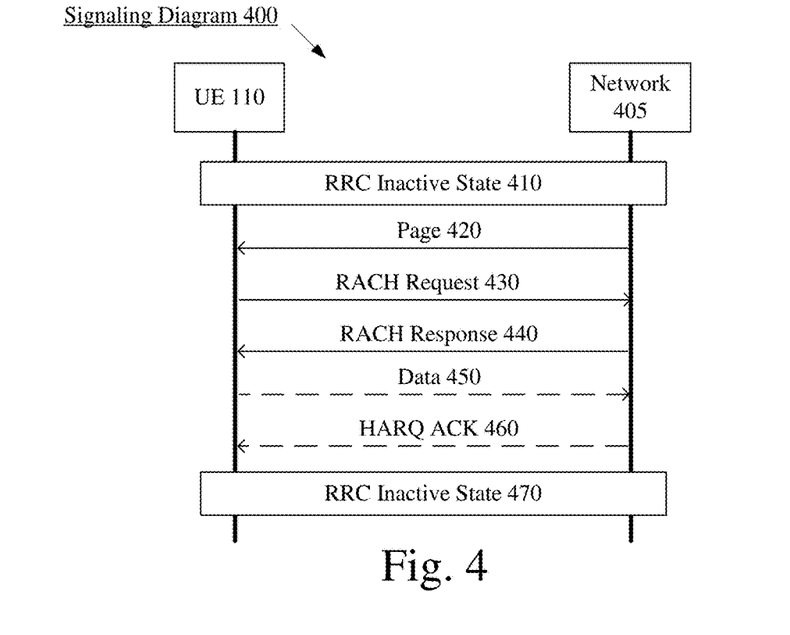
FIG. 4 shows a first exemplary signaling diagram allowing the UE to receive DL traffic from the network in the RRC inactive state according to various exemplary embodiments.

FIG. 4 shows a first exemplary signaling diagram 400 allowing the UE 110 to receive DL traffic from the network 405 in the RRC inactive state according to various exemplary embodiments. In the signaling diagram 400 of FIG. 4, the network 405 may be considered to be either the 5G NR-RAN 120 or the LTE-RAN 122 and the UE 110 may be connected to one of the gNB 120A or the eNB 122A. In the exemplary embodiment described with reference to FIG. 4, the UE assistance information is provided to the network 405 during a Random Access Channel (RACH) procedure that is performed between the network 405 and the UE 110.

It may be considered that the UE 110 is initially in the RRC inactive state 410. As will be described below, the UE 110 may be receiving DL traffic when in this state. The network 405 will send a page 420 to the UE 110. The page 420 may be sent in response to a specified action, e.g., the network 405 has a voice call for the UE 110, the UE 110 sent a scheduling request (SR) to the network 405, etc., or at a predetermined scheduled time. Because the network 405 will understand that the DL data is being sent when the UE 110 is in the RRC inactive state, the network 405 may periodically request the UE 110 to enter the RRC connected state to ensure that the parameters for delivering DL data (e.g., the UE assistance information) during the RRC inactive state are correct. The UE assistance information and the manner of providing the UE assistance information to the network 405 will be discussed in greater detail below.

In response to the page 420, the UE 110 will send a RACH request 430 to the network 405. The RACH request 430 is a request from the UE 110 to establish an RRC connected state with the network 405. Those skilled in the art will understand the information that is normally provided in the RACH request 430. However, in addition to the information normally provided in the RACH request 430, additional information may be provided to the network 405 to allow the network 405 to continue to stream data to the UE 110 when the UE 110 transitions back to the RRC inactive state. This additional information will be referred to as UE assistance information throughout this description. The UE assistance information is a set of data that describes the characteristics of the traffic pattern for the DL data. As described above, the exemplary embodiments are directed to the network 405 transmitting the DL data when the UE 110 is in the RRC inactive state. For these transmissions to be successful, the network 405 should transmit the DL data in a manner that the UE 110 is expecting the DL data to be transmitted. The UE 110 will understand the traffic pattern for the particular application that is being executed on the UE 110, e.g., the exemplary traffic pattern for the streaming application shown in the graph 300 of FIG. 3. The UE 110 may then provide the UE assistance information corresponding to the known traffic pattern to the network 405 such that the network 405 may then deliver the DL data in accordance with the UE assistance information. Exemplary manners of determining the traffic pattern for an application will be described in greater detail below.

The UE assistance information may be included in, for example, a Medium Access Control (MAC) Control Element (CE) that is included in the RACH request 430. The UE assistance information may include a minimum grant size, a minimum grant frequency and a minimum grant duration. It should be understood that these parameters are only exemplary and there may be other types of information that are also included in the UE assistance information to provide the network 405 with information concerning sending the DL data. As described above with reference to FIG. 3, the DL traffic pattern may be generally known by the UE 110. Thus, the UE 110 may provide the UE assistance information to the network 405 so that the network may format the DL data transmissions in a manner that allows the UE 110 to receive the DL data when in the RRC inactive state.

Prior to discussing the UE assistance information in more detail, it is noted that the traffic pattern may be determined in various manners. In a first example, the UE 110 may have experience with a particular application (e.g., a video streaming service) and understand the traffic pattern that will occur based on prior use of the application. In a second example, the UE 110 may allow the application to stream the data in the normal manner (e.g., using the RRC connected state including monitoring the PDCCH) for a period of time to determine the traffic pattern for the current use of the application and after the current traffic pattern is determined, the UE 110 may switch to use the exemplary embodiments. In a third example, applications may be grouped into application types (e.g., a video streaming application may be a first type, an audio streaming application (podcast, music streaming) may be a second type, etc.) and the UE 110 may understand the traffic pattern for each application type. Thus, when an application is launched, the UE 110 may understand the associated application type and the traffic pattern associated with the application type. In a fourth example, the UE 110 may crowd source the traffic pattern for the currently running application. Furthermore, other factors such as the quality of the current radio connection, the type of network, etc. may also affect the traffic pattern for the application.

Thus, once the UE 110 knows the traffic pattern, the UE 110 may provide the UE assistance information to the network 405, e.g., via the MAC CE of the RACH request 430. As also described above, the UE assistance information may include a minimum grant size, a minimum grant frequency and a minimum grant duration. These parameters are provided to allow the network 405 to send the streaming data to the UE 110 when in the RRC inactive state in a manner such that the UE 110 will be listening for and receive the data. The minimum grant size is provided so that the network 405 understands the minimum size of the grant that is required to provide the streaming data to the UE 110. For example, if it were considered that the exemplary traffic pattern shown in the graph 300 was the current traffic pattern, the UE 110 may set the minimum grant size to accommodate the largest burst of data shown in FIG. 3 as data burst 330. The minimum grant frequency may be based on the time between each of the data bursts. The minimum grant duration may be based on the longest duration of the data bursts. For example, as shown in FIG. 3, the data bursts 320 have the peak duration even though these bursts are not the largest bursts in terms of data.

In response to the RACH request 430, the network 405 may provide a RACH response 440 that includes the uplink (UL) grant for the UE 110 to transmit data to the network. Upon receiving the RACH response 440, the UE 110 may send the data 450 to the network 405 using the UL grant(s) provided in the RACH response 440. The network 405 may provide a HARQ ACK 460 to indicate the network 405 has received the data 450. The data 450 and the HARQ ACK 460 are shown in dashed lines because there may be multiple exchanges of data and HARQ ACKs while the UE 110 is in the RRC connected state. After the UL data 450 has been sent and acknowledged, the UE 110 may transition back to the RRC inactive state 470.

However, while the UE 110 is in the RRC inactive state 470, the network 405 may continue to transmit DL data (e.g., the streaming data) to the UE 110 based on the information that was provided to the network in the RACH request 430. As described above, in the RRC inactive state, the UE 110 may continue to monitor the network 405 in a more passive manner than when in the RRC connected state or RRC idle state. This monitoring may include monitoring the data channels without monitoring the PDCCH. Because the UE 110 has provided the network 405 with the UE assistance information (e.g., in the RACH request 430), the UE 110 will understand when the data bursts for the streaming data will be sent by the network 405. Thus, in this manner the UE 110 may receive the DL data in the RRC inactive state without having to waste power by constantly monitoring the PDCCH.

In addition, while the above exemplary embodiment has been described with reference to the UE 110 executing a single streaming application, it should be understood that the UE 110 may be simultaneously operating other applications. For example, the UE 110 may have an email application, a navigation application, etc. that are active at the same time as the streaming application. These other applications may also receive DL data including foreground or background data. The UE 110 may align these other executing applications with the streaming application so that the DL data for these applications is also received during the RRC inactive state. It should be understood that the UE 110 may alter the UE assistance information provided in the MAC CE to account for these other applications (e.g., changing the minimum grant size, etc.).

It should also be understood that the exemplary embodiments do not require the UE 110 to remain the RRC inactive state when receiving the DL data. For example, there may be scenarios where the UE 110 transitions to an RRC connected state to receive DL data because one or more of the executing applications require an RRC connected state for DL data.

In addition, the UE 110 may also change the UE assistance information during while the streaming application is executing. For example, the radio conditions may change over time when the streaming application is executing, and this may alter the traffic pattern. The UE 110 may determine this altered traffic pattern and send updated additional data during the next available RACH request to the network 405 to alter the manner in which the network 405 delivers the DL data. Thus, the manner of delivering the DL data is not required to be static once the streaming application has been started.

Figure 5:
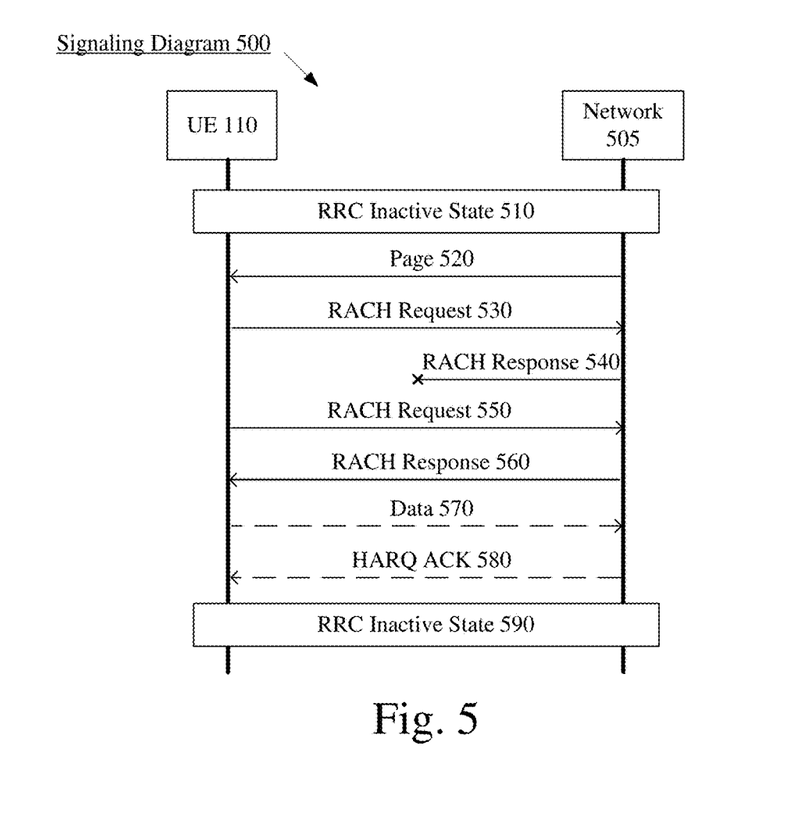
FIG. 5 shows a second exemplary signaling diagram allowing the UE to receive DL traffic from the network in the RRC inactive state according to various exemplary embodiments.

FIG. 5 shows a second exemplary signaling diagram 500 allowing the UE 110 to receive DL traffic from the network 505 in the RRC inactive state according to various exemplary embodiments. Again, the network 405 may be considered to be either the 5G NR-RAN 120 or the LTE-RAN 122 and the UE 110 may be connected to one of the gNB 120A or the eNB 122A. The signaling diagram 500 is similar to the signaling diagram 400 in that the UE assistance information is provided to the network 405 during a RACH procedure that is performed between the network 405 and the UE 110. The signaling for the RRC inactive state 510, the page 520 and the RACH request 530 is similar to the corresponding signals in the signaling diagram 400. The RACH request 530 will include the UE assistance information that the network 505 will use to provide the DL data during the RRC inactive state of the UE 110.

However, in this example, the UE 110 does not receive the RACH response 540. Those skilled in the art will understand that there may be various reasons for the UE 110 not receiving the RACH response 540 such as, for example, a degradation of the radio channel, interference, the network 505 not having received the original RACH request 530, etc. In the example of FIG. 5, the UE 110 will retransmit the RACH request 550 to the network 505. This retransmission will include the same information as the original RACH request 530 including, for example, the MAC CE with the UE assistance information. The UE 110 may then receive the RACH response 560 and the signaling will continue in the same manner as described above with reference to FIG. 4. Again, because the network 505 has received the UE assistance information from the UE 110, the network 505 may transmit the DL data during the RRC inactive state 590.

Figure 6:
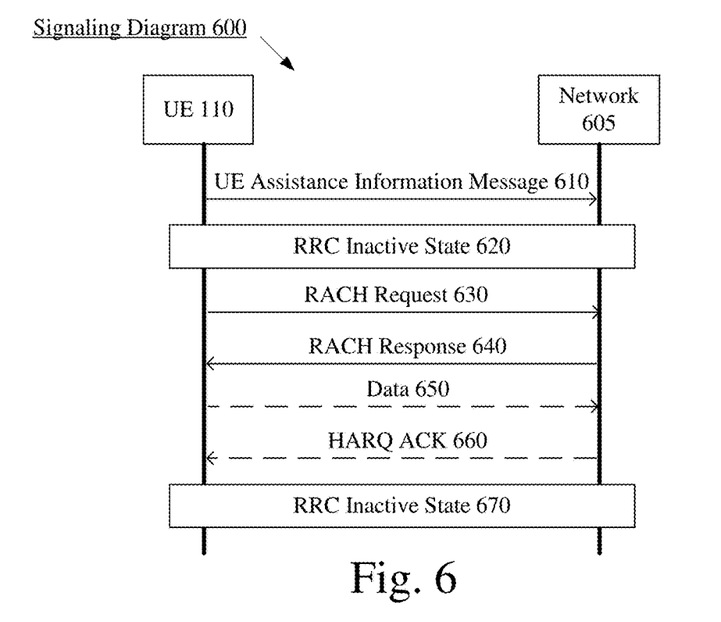
FIG. 6 shows a third exemplary signaling diagram allowing the UE to receive DL traffic from the network in the RRC inactive state according to various exemplary embodiments.

FIG. 6 shows a third exemplary signaling diagram 600 allowing the UE 110 to receive DL traffic from the network 605 in the RRC inactive state according to various exemplary embodiments. Again, the network 605 may be considered to be either the 5G NR-RAN 120 or the LTE-RAN 122 and the UE 110 may be connected to one of the gNB 120A or the eNB 122A. In the exemplary embodiment described with reference to FIG. 6, the UE assistance information is provided to the network 605 when the UE 110 is in an RRC connected state with the network 605.

In FIG. 6, it may be considered that the UE 110 is initially in an RRC connected state with the network 605. While in the RRC connected state, the UE 110 may exchange data with the network 605. As part of this data exchange, the UE 110 may provide the UE assistance information in a UE assistance information message 610 to the network 605. However, it should be understood that the UE 110 may provide the UE assistance information as part of any message that is exchanged during the RRC connected state with the network 605. The UE assistance information may the same as described above with reference to the signaling diagram 400 but it is delivered at a different time, e.g. during the RRC connected state as opposed to during the RACH procedure in FIG. 4.

The UE 110 may then transition to the RRC inactive state 620. During the RRC inactive state, the network 605 may transmit the DL data to the UE 110 based on the UE assistance information provided during the previous RRC connected state. At a later time, the UE 110 may want to enter the RRC connected state to exchange further information with the network 605. To enter the RRC connected state, the UE 110 will transmit a RACH request 630 to the network 605. Since the UE assistance information was previously transmitted during the last RRC connected state, the RACH request 630 may not include the UE assistance information as was done in the signaling diagram 400.

The network 605 will transmit a RACH response 640 including uplink grant(s) for the UE 110 and the UE 110 will enter the RRC connected state. During the RRC connected state the UE 110 will transmit data 650 to the network 605 and receive HARQ ACKs 660 to acknowledge the data 650 has been received by the network 605. When the data 650 transmissions are complete, the UE 110 will transition back to the RRC inactive state 670. Again, while in this RRC inactive state 670, the UE 110 may continue receiving the DL data from the network 605 in accordance with the UE assistance information.

It should be understood that in the present example, the UE 110 did not send any additional UE assistance information during the most recent RRC connected state (e.g., associated with data 650). Thus, the network 605 will continue to send the DL data in accordance with the UE assistance information received in the UE assistance information message 610. However, the UE 110 may send an additional UE assistance information message during the most recent RRC connected state (e.g., corresponding to the data exchange 650) to alter the UE assistance information. Thus, when the network 605 transmits the DL data during the RRC inactive state 670, the network 605 may send the DL data in accordance with the newly received UE assistance information.

Figure 7:
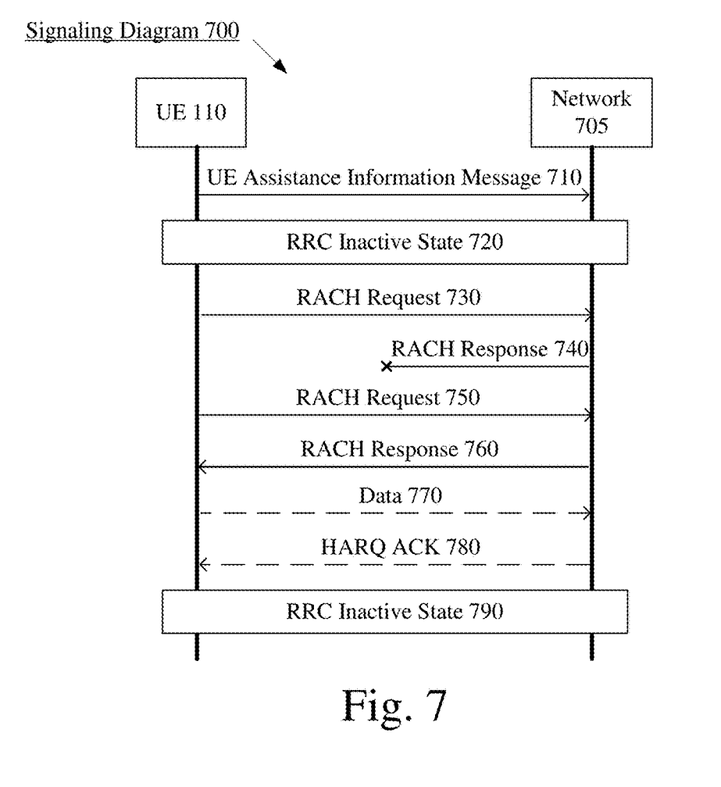
FIG. 7 shows a fourth exemplary signaling diagram allowing the UE to receive DL traffic from the network in the RRC inactive state according to various exemplary embodiments.

FIG. 7 shows a fourth exemplary signaling diagram 700 allowing the UE 110 to receive DL traffic from the network 705 in the RRC inactive state according to various exemplary embodiments. Again, the network 705 may be considered to be either the 5G NR-RAN 120 or the LTE-RAN 122 and the UE 110 may be connected to one of the gNB 120A or the eNB 122A. The signaling diagram 700 is similar to the signaling diagram 600 in that the UE assistance information is provided to the network 705 when the UE 110 is in an RRC connected state with the network 705.

In FIG. 7, it may be considered that the UE 110 is initially in an RRC connected state with the network 705. While in the RRC connected state, the UE 110 may exchange data with the network 705. As part of this data exchange, the UE 110 may provide the UE assistance information in a UE assistance information message 710 to the network 705. The UE 110 may then transition to the RRC inactive state 720. During the RRC inactive state, the network 705 may transmit the DL data to the UE 110 based on the UE assistance information provided during the previous RRC connected state. At a later time, the UE 110 may want to enter the RRC connected state to exchange further information with the network 705. To enter the RRC connected state, the UE 110 will transmit a RACH request 730 to the network 705. Since the UE assistance information was previously transmitted during the last RRC connected state, the RACH request 730 may not include the UE assistance information.

However, in this example, the UE 110 does not receive the RACH response 740. In the example of FIG. 7, the UE 110 will retransmit the RACH request 750 to the network 705. The UE 110 may then receive the RACH response 760 and the signaling will continue in the same manner as described above with reference to FIG. 6. Again, because the network 705 has received the UE assistance information from the UE 110 during the previous RRC connected state (e.g., UE assistance information message 710), the network 705 may transmit the DL data during the RRC inactive state 790.

Figure 8:
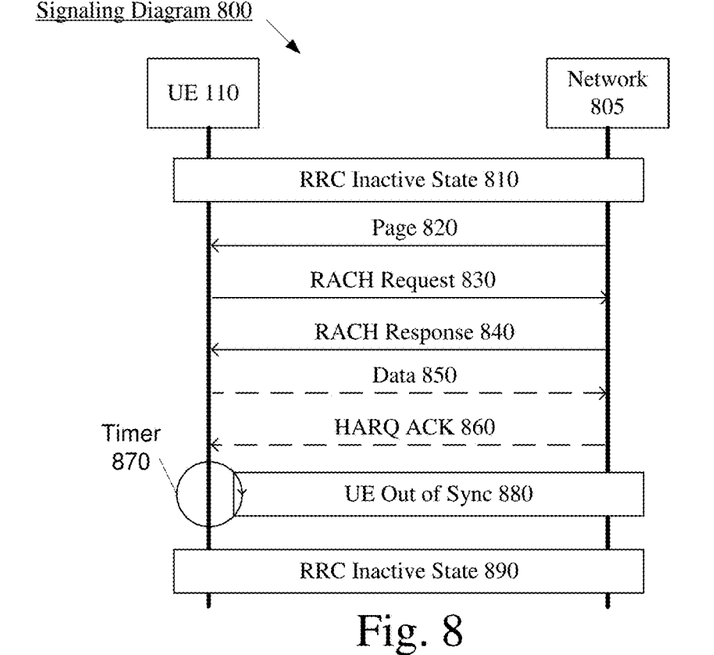
FIG. 8 shows a fifth exemplary signaling diagram allowing the UE to receive DL traffic from the network in the RRC inactive state according to various exemplary embodiments.

FIG. 8 shows a fifth exemplary signaling diagram 800 allowing the UE 110 to receive DL traffic from the network 805 in the RRC inactive state according to various exemplary embodiments. Again, the network 805 may be considered to be either the 5G NR-RAN 120 or the LTE-RAN 122 and the UE 110 may be connected to one of the gNB 120A or the eNB 122A. The signaling diagram 800 is similar to the signaling diagram 400 in that the UE assistance information is provided to the network 805 during a RACH procedure that is performed between the network 405 and the UE 110. The signaling for 810-860 is similar to the corresponding signals 410-460 in the signaling diagram 400 and will not be described again.

As described above, the data 850 and the HARQ ACK 860 may include multiple exchanges messages between the UE 110 and the network 805. Each time a HARQ ACK 860 is sent a tracking area code (TAC) may be included in the HARQ ACK. The UE 110 may also include a Time Alignment Timer (TAT). The TAT is reset each time the TAC is received. When the TAT expires, the UE 110 has not received a message from the network 805 for the length of the TAT and the UE 110 assumes that it is now out of sync with the network 805. The signaling diagram 800 shows that the UE 110 may also implement a further timer 870, the time of which may be negotiated between the UE 110 and the network 805. Even though the UE 110 is out of sync 880 with the network 805, the network 805 may still send data to the UE 110. That is, the UE 110 will remain in the RRC connected state even though the UE 110 is out of sync 880 during the time that timer 870 is active so that the UE 110 may receive additional data from the network 805, e.g., the UE 110 may monitor the PDCCH during this time to receive information concerning additional DL data from the network 805. When the timer 870 expires, the UE 110 will transition back to the RRC inactive state 890 and may continue to receive the DL data as described above.

Figure 9:
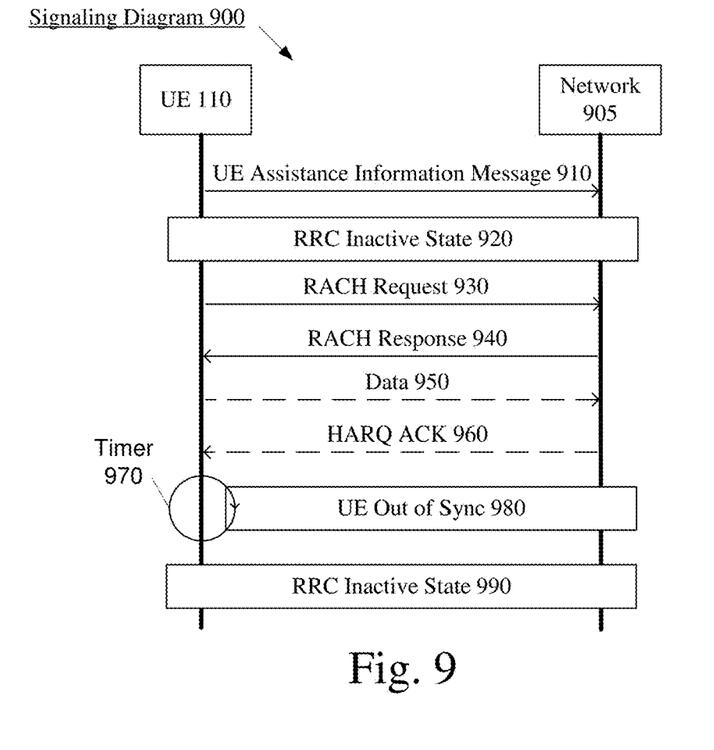
FIG. 9 shows a sixth exemplary signaling diagram allowing the UE to receive DL traffic from the network in the RRC inactive state according to various exemplary embodiments.

FIG. 9 shows a sixth exemplary signaling diagram 900 allowing the UE 110 to receive DL traffic from the network 905 in the RRC inactive state according to various exemplary embodiments. Again, the network 905 may be considered to be either the 5G NR-RAN 120 or the LTE-RAN 122 and the UE 110 may be connected to one of the gNB 120A or the eNB 122A. The signaling diagram 900 is similar to the signaling diagram 600 in that the UE assistance information is provided to the network 805 is provided to the network 905 when the UE 110 is in an RRC connected state with the network 905. The signaling for 910-960 is similar to the corresponding signals 610-660 in the signaling diagram 600 and will not be described again.

Similar to the signaling diagram 800, the signaling diagram 900 shows that the UE 110 may also implement a further timer 970, the time of which may be negotiated between the UE 110 and the network 905 that is started when the UE 110 goes out of sync 980 with the network 905. As described above, the UE 110 will remain in the RRC connected state even though the UE 110 is out of sync 980 during the time that timer 970 is active so that the UE 110 may receive additional data from the network 905, e.g., the UE 110 may monitor the PDCCH during this time to receive information concerning additional DL data from the network 905. When the timer 970 expires, the UE 110 will transition back to the RRC inactive state 990 and may continue to receive the DL data as described above.

Signaling diagrams 400-900 show various signaling that may be used by a UE and a network to allow the network to transmit DL data to the UE when the UE is in the RRC inactive state. When the UE receives data in the RRC inactive state, the UE is not required to monitor the PDCCH meaning that the UE does not have to expend the energy associated with the constant monitoring of the PDCCH as in the conventional manner.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
    at a user equipment (UE) that is connected to a network:
        executing an application that receives data from the network;
        transmitting UE assistance information to the network, wherein the UE assistance information corresponds to a traffic pattern for the data that is received from the network for the application;
        entering a radio resource control (RRC) inactive state; and
        receiving the data from the network while in the RRC inactive state without monitoring a physical downlink control channel (PDCCH).

2. The method of claim 1, wherein the UE assistance information is transmitted in a Random Access Channel (RACH) request.

3. The method of claim 1, wherein the UE assistance information is transmitted when the UE is in an RRC connected state with the network.

4. The method of claim 1, wherein the UE assistance information comprises one of a minimum grant size, a minimum grant frequency and a minimum grant duration.

5. The method of claim 1, further comprising:
    determining the traffic pattern associated with the application.

6. The method of claim 1, wherein the application is a streaming application.

7. The method of claim 1, further comprising:
    executing a second application; and
    aligning incoming data transmissions for the second application with the receipt of the data for the application when the UE is in the RRC inactive state.

8. The method of claim 1, further comprising:
    determining that the UE is out of synchronization with the network;
    starting a timer when the UE is out of synchronization with the network, wherein the UE remains in an RRC connected state during a length of the timer;
    monitoring a control channel during the length of the timer for downlink data transmissions from the network; and
    transitioning to the RRC inactive state when the timer expires.

9. A user equipment (UE), comprising:
    a transceiver configured to communicate with a network; and
    a processor configured to perform operations, the operations comprising:

executing an application that receives data from the network;
transmitting UE assistance information to the network, wherein the UE assistance information corresponds to a traffic pattern for the data that is received from the network for the application;
entering a radio resource control (RRC) inactive state; and
receiving the data from the network while in the RRC inactive state without monitoring a physical downlink control channel (PDCCH).

10. The UE of claim 9, wherein the UE assistance information is transmitted in a Random Access Channel (RACH) request.

11. The UE of claim 9, wherein the UE assistance information is transmitted when the UE is in an RRC connected state with the network.

12. The UE of claim 9, wherein the UE assistance information comprises one of a minimum grant size, a minimum grant frequency and a minimum grant duration.

13. The UE of claim 9, wherein the operations further comprise:
determining the traffic pattern associated with the application.

14. The UE of claim 9, wherein the processor comprises an application processor and a baseband processor, wherein the application processor executes the application.

15. The UE of claim 9, wherein the operations further comprise:
executing a second application; and
aligning incoming data transmissions for the second application with the receipt of the data for the application when the UE is in the RRC inactive state.

16. The UE of claim 9, wherein the operations further comprise:
determining that the UE is out of synchronization with the network;
starting a timer when the UE is out of synchronization with the network, wherein the UE remains in an RRC connected state during a length of the timer;
monitoring a control channel during the length of the timer for downlink data transmissions from the network; and
transitioning to the RRC inactive state when the timer expires.

17. An integrated circuit, comprising:
circuitry configured to transmit UE assistance information to a network, wherein the UE assistance information corresponds to a traffic pattern for data that is received from the network for an application;
circuitry configured to enter a radio resource control (RRC) inactive state; and
circuitry configured to receive the data from the network while in the RRC inactive state without monitoring a physical downlink control channel (PDCCH).

18. The integrated circuit of claim 17, wherein the UE assistance information is transmitted in a Random Access Channel (RACH) request.

19. The integrated circuit of claim 17, wherein the UE assistance information is transmitted during an RRC connected state with the network.

20. The integrated circuit of claim 17, wherein the UE assistance information comprises one of a minimum grant size, a minimum grant frequency and a minimum grant duration.

* * * * *